United States Patent [19]

Rosling

[11] 4,097,228

[45] Jun. 27, 1978

[54] FURNACE COVER

[75] Inventor: Denys Reginald Rosling, Graniteville, S.C.

[73] Assignee: The Babcock & Wilcox Company, New York, N.Y.

[21] Appl. No.: 752,341

[22] Filed: Dec. 20, 1976

[51] Int. Cl.² .............................................. F27D 1/18
[52] U.S. Cl. ........................................ 432/250; 49/465; 49/466; 110/173 A; 220/235
[58] Field of Search ................... 432/250; 49/465, 466, 49/463; 110/173 C, 173 A; 202/251; 220/235, 236, 237, 215, 327

[56] References Cited

U.S. PATENT DOCUMENTS

| | | | |
|---|---|---|---|
| 1,868,824 | 7/1932 | Grapp | 110/173 R |
| 2,316,688 | 4/1943 | Haase | 49/465 |
| 2,742,177 | 4/1956 | Watson | 220/378 |
| 3,048,382 | 8/1962 | Mansfield | 432/192 |
| 3,084,828 | 2/1963 | Davies | 220/327 |
| 3,268,722 | 8/1966 | Nolan | 49/463 |

*Primary Examiner*—John J. Camby
*Assistant Examiner*—Larry I. Schwartz
*Attorney, Agent, or Firm*—Joseph M. Maguire; Vincent M. Fazzari; Angelo Notaro

[57] ABSTRACT

A flexible insulating blanket attached to a metal backing with adjustable panels about the backing is used to cover the opening of a carbon anode baking furnace to bring about sealing contact between the cover and the furnace walls so as to minimize thermal requirements and losses from the furnace.

7 Claims, 5 Drawing Figures

FURNACE COVER

BACKGROUND OF THE INVENTION

Carbon anodes are of frequent use in electric arc furnaces and are of particular importance for use in electrolytic alumina reduction cells. Baking phase processing requirements for the anodes are most important since between 1000 – 1620 lbs. of carbon anode are consumed in producing one ton of aluminum. The anodes are generally stacked in submerged pits, several hundred of which constitute a carbon anode baking furnace, wherein the anodes are heat treated to produce elements with certain desirable characteristics. The industry has found that the anode bake temperature influences cell carbon consumption, metal production, metal purity and general operating efficiency in the anode end use environment. Even heat distribution therefore affects the general overall desirability and uniform quality of the end product anode.

It has been found that carboxy reactivity and the electrical resistivity have a direct relationahip to the baking temperature of the anode and that a baking temperature of 1050° C, (1922° F) is required to give the most desirable characteristics such as lowest carboxy reactivity and highest electrical resistivity. Carboxy reactivity is an indication of the rate of consumption of the anode in the electrolytic cell. A uniform temperature throughout the baking furnace is essential to ensure uniform quality of the end product.

A typical approach to solving the heretofore described problems has been to utilize a coke bed. Generally, a layer of coke, typically 16-26 inches thick is placed between and on top of the anodes. The coke offers some resistance to cold air infiltrating the pit which is a contributary factor to the pit temperature differential. The inability of the coke to reduce the cold air sufficiently and the cost and labor involved in its use are serious process drawbacks. Alternate methods are desirable. Experimentation with dense castable refractory covers and insulating castable refractory covers have proved such an approach is undesirable since the placing and removing of the covers must be carried out with extreme caution to prevent damaging the covers and/or the flues. Pit covers of rammed anode mix and cathode mix have been evaluated but the high thermal conductivity of such covers proved to make them less effective than the coke blankets. As such, none of the above approaches have been proven as a viable alternative to replace the coke blanket. A primary reason for this is that the pit walls tend to warp producing irregular boundaries. The rigidly fixed periphery of other types of covers prohibits easy adaptation to the pit's irregular boundaries thus allowing cool air to seep into the pit area.

SUMMARY OF THE INVENTION

The present invention is generally directed at a new and improved cover for use in a carbon anode baking furnace and the like so as to minimize fuel requirements without sacrifice of product quality or production. The invention is particularly suited for use in a carbon anode bake furnace.

The present invention comprises a base plate or back plate which is equipped with panels about the plate's periphery. The panels are so constructed as to be adjustable. Flexible insulation covers that face of the back plate to be directly exposed to the interior furnace conditions. Likewise, flexible insulation also covers the outer faces of the panels. Adjustment members allow deflection of sections of the panels so as to form a seal with the bowed furnace walls. When placed in position, such a cover arrangement reduces heat losses from the furnace while sealing against inflowing cooler air. The cover also acts to trap contaminants which would otherwise be released to the atmosphere. Because the cover is so effective when used in a carbon anode baking furnace, the coke bed can be substantially reduced resulting in savings of time, labor and coke. With a reduction in the coke bed and the heat savings resulting therefrom it has been found that the capacity of the furnace is increased and more anodes can be processed in the same unit of time without sacrifice of anode quality.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

DESCRIPTION OF THE PREFERRED EMBODIMENT

Figure 1:
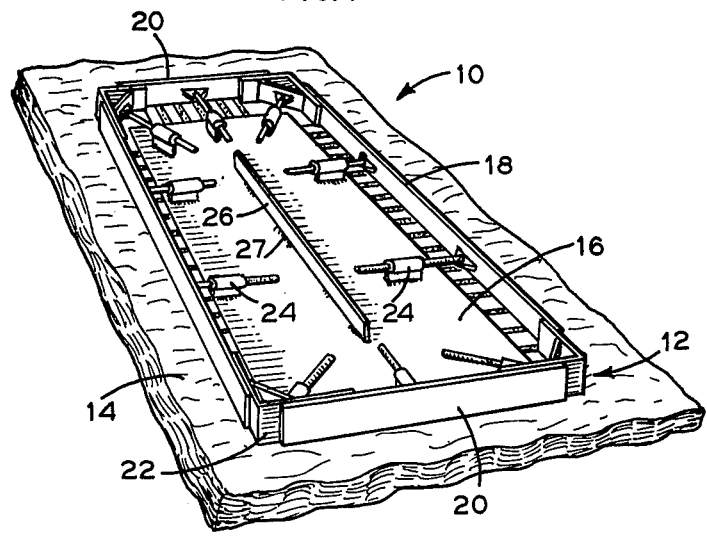
FIG. 1 generally depicts the assembled cover.

The present invention is generally directed to a furnace cover using compressible insulation, the cover being equipped with flexible panels so as to conform the cover's perimeter to a furnace opening with regular or irregular wall boundaries. FIG. 1 generally depicts an assembled cover 10 comprised of a metal backing 12 and insulation material 14 which is preferably of the ceramic fiber variety. The metal backing 12, itself an assembly of a number of components, can be constructed of carbon steel but may, if the application so allows, be constructed of any suitable type material. The backing consists of a base plate 16 the bottom face of which is covered by insulation 14. It is important to note that multiple layers of insulation can be used and when such is the case, those layers closest to the backing's bottom face may be mineral wool or the like while those layers closest the furnace interior are preferably of a ceramic fiber. Defining the outer perimeter of the backing are flexible side panels 18 and flexible end panels 20. The side and end panels are joined by corner panels 22. Adjustment members 24 are firmly attached to base plate 16 and individually to panels 18 and 20 and corner panel 22. For simplicity of expression, the side, end and corner panels will hereinafter collectively be referred to as the "panels" unless separate designation be warranted to avoid confusion. Stiffening member 26, fixably attached to base plate 16 by welds 27, if perforated can simultaneously serve as the equivalent of a lifting lug for placement and removal of the cover.

Figure 2:
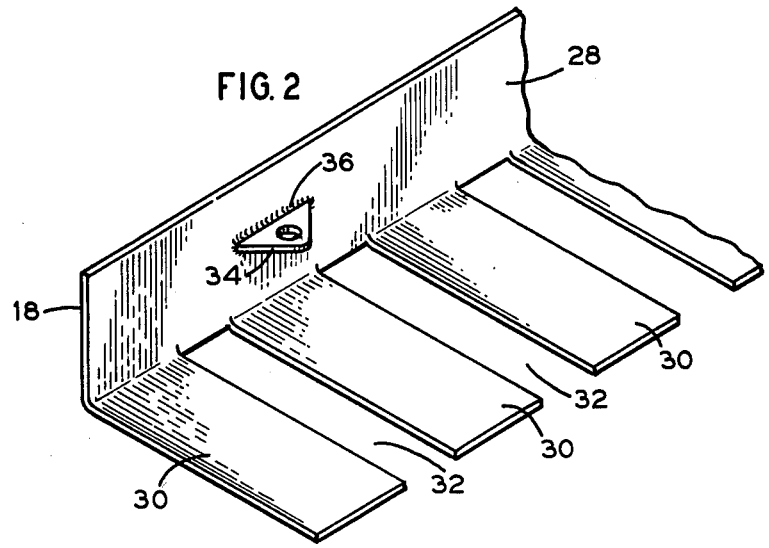
FIG. 2 shows a detail of a portion of the flexible panel.

FIG. 2 shows a detailed construction of portions of a side or end flexible panel, which for simplicity of description is designated as 18. The panel 18 consists of a panel wall 28 and substantially perpendicular thereto, panel angle sections 30 spaced along the panel wall length by cutaway sections 32. Connecting lug 34 which is fashioned with a hole is fixedly attached by weld 36 or other attachment means to panel wall 28. Connecting lug 34 will be used in conjunction with adjustment members 24 as hereinafter explained.

Figure 3:
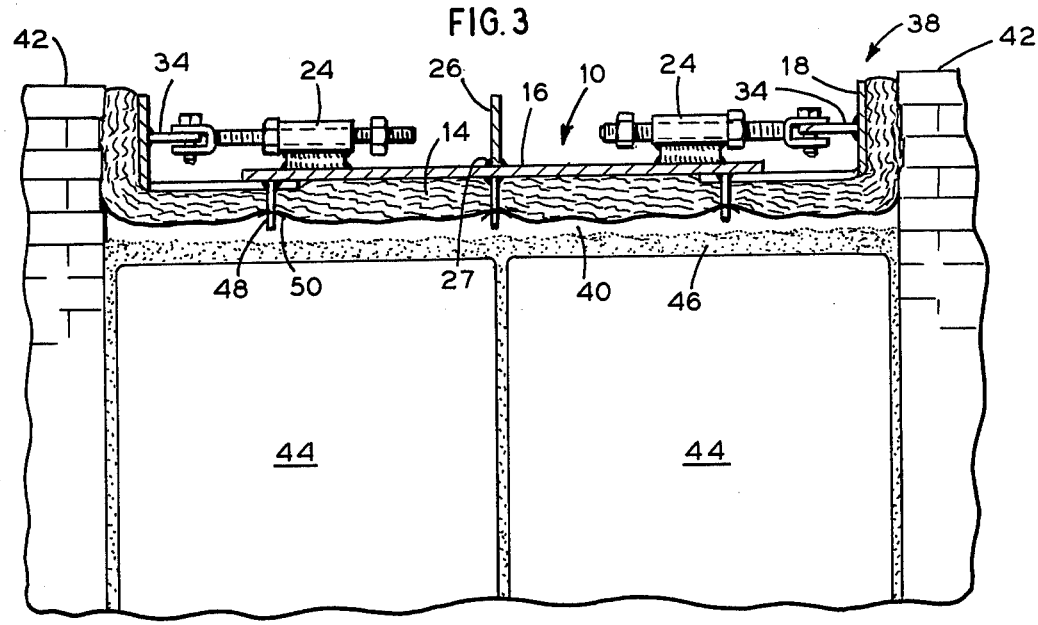
FIG. 3 shows a cutaway view of the cover in place in a furnace section and details of the cover construction taken along line 3—3 of FIG. 4.

FIG. 3 shows a cutaway view of the cover in place in a furnace section. Additional details of the cover construction are also shown. As shown, the furnace section 38 is in the form of a submerged pit 40 with horizontally bowed boundary walls 42. Stacked deep within the furnace pit 40 are the unprocessed anodes 44. Covering the anodes 44 is a coke bed 46. Lodged within furnace walls 42, in sealing contact therewith, is cover 10. Sealing contact is brought about by contouring the flexible panels 18, 20, and 22 to conform with the irregularities of the walls 42 and is effective to minimize heat losses from the heated air drawn through the furnace by the integral flue system (not shown). At the same time, the sealing arrangement contains vaporous and fume like emissions from the pit and prevents the induced leakage of the cooler air surrounding the pit area. As shown, base plate 16 is attached to the panels by studs 48 which also traverse the insulation material 14. The insulation is kept firmly placed by washers 50. Alternate arrangements of the method of attaching the insulation material to the base plate and panels are within the scope of the present invention.

Figure 4:
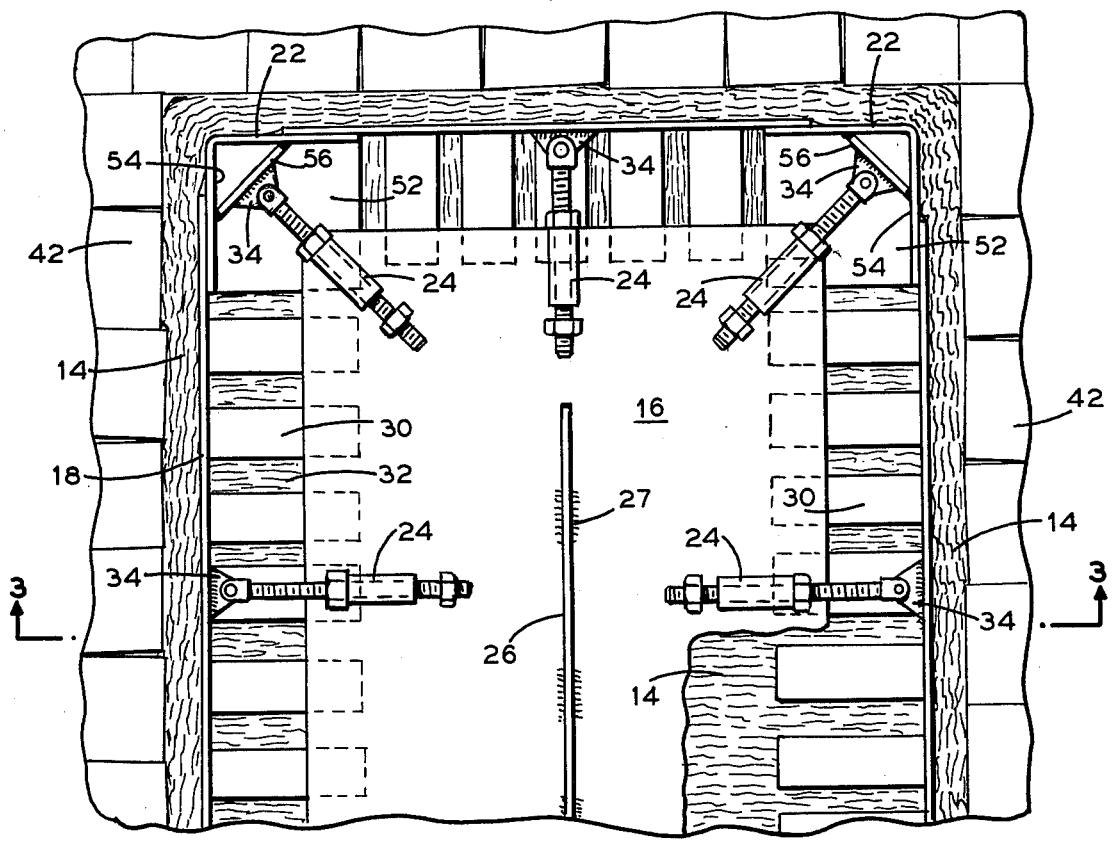
FIG. 4 is a plan view of FIG. 3

FIG. 4 is a plan view of FIG. 3. As clearly shown, furnace walls 42 are bowed in boundary configuration. This occurs due to continuous expansions and contractions which accompany the heating and cooling cycles experienced in this type of operation. Insulation material 14 is shown as being in sealing contact with the walls 42. This is possible because of the flexible nature of the insulation material 14, the panels 18, 20, and 22 and their manipulation by adjustment members 24. The corner panel 22 consists of a base plate 52, panel siding 54, and corner angle 56. The panel siding 54 overlaps with and is juxtaposed between side panel 18 and end panel 20, while framing base plate 52. Corner angle 56 bridges the panel siding 54 in a catty-cornered arrangement and is in connection with adjustment members 24 via connecting lugs 34.

Figure 5:
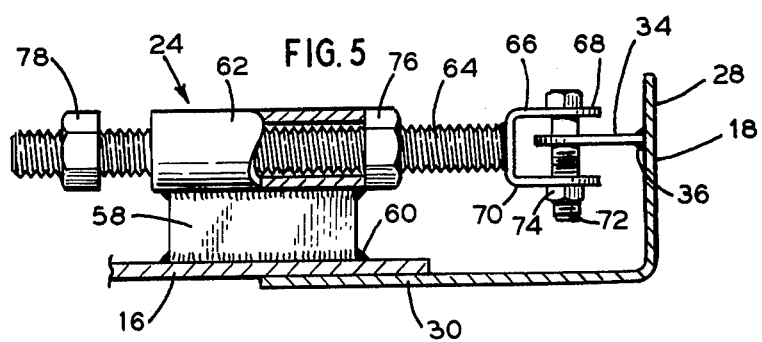
FIG. 5 is an enlarged view showing the adjusting members in connection with a panel.

FIG. 5 shows a particular embodiment of adjustment member 24 which may be used in practicing the invention. As shown, adjustment member 24 consists of a supporting shoulder 58 affixed to base plate 16 by welds 60. Firmly attached to shoulder 58 and resting thereupon is support cylinder 62. Threaded rod 64 passes through cylinder 62 and terminates in bolt attachment 66. Attachment 66 is fashioned with coaxial holes in each of its respective legs 68 and 70. Bolt 72 passes through the holes of the legs and also through the hole of connecting lug 34 and is fastened by nut 74. Front nut 76 which is connected between cylinder 62, bolt attachment 66 and rear nut 78 are used in conjunction with threaded rod 64 for adjusting and securing purposes. After the cover 10 has been put in place, rod 64 is advanced towards the panel 18 and rear nut 78 is moved along the rod flush to cylinder 62. The front nut 76 is then turned until it also contacts cylinder 62. This advances rod 64 toward the panel 18 exerting pressure thereupon which in turn causes the panel wall 28 to deflect from its normal position. Due to the distribution of stresses in the wall, adjacent angle sections 30 will tend to fill cutaway sections 32 when the panel wall 28 is deflected away from the cover interior, but will tend to open when wall 28 is deflected towards the panel interior. Alternate types of adjustment members, such as quick acting toggle clamps or turnbuckles may be employed in the practice of the present invention.

Two adjacent furnace pits were selected for testing the above described cover. Three layers of 1 inch Kaowool (Registered Trademark) blanket were attached to the underside of the cover and studded with B&W Kao-Lok Inconnel 601 studs. In one pit, the B&W Kaowool blanket lined cover was placed over 9 inches of coke. The other adjacent pit followed the normal practice and had only 16 inches of coke and no insulated cover. Thermocouple protection tubes were placed down in the center of the furnace pits and thermocouples were inserted at various depths. It was found that the pit using 9 inches of coke and the 3 inch Kaowool blanket was the more efficient showing a temperature variation of 92.5° C from the mean while the uncovered pit showed a difference of 270° C or a variance of 135° C from the mean. Moreover, the average mean pit temperature was increased 100° with the proposed cover. Since it has been accepted that the mean temperature influences the actual heat consumption, improved temperature distribution will result in fuel savings. A variance of 10° C in the mean temperature is estimated to change heat requirements for the particular furnace site by 17.4 KCal/kg (316 BTU/LB of anode. Moreover, with the Kaowool cover on the pit, the temperature at the middle of the topmost anode was measured at 1100° C and that of the coke cover alone was measured at 1025° C showing a higher efficiency for the proposed cover.

The cold face of the coke blanket was recorded at 340° F with a hot face temperature of 1526° C giving a heat loss of 859 BUT /sq. ft./hr. The pit size was 11 feet - 8 inches by 3 feet - 0 giving a total heat loss of 30,280 BTU/hr. The cold face of the proposed refractory furnace cover was 232° F with a hot face temperature of 1679° F giving a heat loss of 377 BTU/sq. ft./hr. or a total heat loss of 13,289 BTU/ hr. thereby resulting in a savings of 16,991 BTU/hr. or 43% per furnace pit. In addition, the savings realized through the cover heat storage of the proposed cover must be considered. This is estimated to amount to approximately 325,000 BTU/pit/fire. On the basis of 17 pit fires per year, and 480 pits per ring furnace, the estimated heat savings in reducing the coke bed from 16 to 9 inches and substituting the lower heat storage fiber material is 2,560,000,000 BTU/year per furnace. It is estimated that an additional 366,000,000 BTU/year can be saved in heat storage for each additional (1) inch of the coke bed which is removed. Additional heat savings is realized by replacement of the cover on the pit after removal of the anodes as this enables the furnace walls to retain a large portion of the heat energy stored therein.

While the above thermal figures are of impressive magnitude, the greatest thermal savings realized by use of the proposed cover is through the reduction of cold air entering the pits due to the flue suction. Effective sealing of the cover with the pit boundaries allows a nearly constant vacuum to be drawn from the manifold. Because of furnace configuration, often the pits being fired are distant from the manifold resulting in larger amounts (typically ten fold) of air being drawn in than are necessary for the section under fire. It has been estimated that the heat waste due to larger amounts can be as much as 2,206,000 BTU per ton of anode baked depending on the pit configuration. Considering a typical baking furnace processes 3500 tons of anode per year, the thermal savings realized from reduction of the excess air alone approaches 77,000,000,000 BTU per year.

The embodiments of the invention in which an exclusive property or privilege is claimed are defined as follows:

1. A cover for sealing a furnace opening comprising a metal backing, panels disposed about the perimeter and extending transversely of the backing, flexible insulation material lining and overlapping the backing and panels, and means connected to the panels and backing for adjustably moving the panels and the insulation material associated therewith in the direction of the perimeter of the furnace opening to bring about sealing contact of the insulation with the perimeter of the opening.

2. A cover as in claim 1 wherein the flexible insulation material is a ceramic fiber.

3. A cover as in claim 1 wherein the adjustment means are toggle clamps.

4. A cover as in claim 1 wherein at least one of the panels includes right angle shaped legs and one of the legs of the panel is formed with spaced sections which experience displacement when the panel is moved in the direction of the perimeter of the opening.

5. A cover as in claim 2 wherein the ceramic fiber material is in blanket form.

6. A cover for sealing a furnace opening comprising a backing, panels disposed about the perimeter and extending transversely of the backing, flexible insulation material overlapping the backing and panels, and means connected to the panels and backing for adjustably moving the panels and the insulation material associated therewith in the direction of the perimeter of the furnace opening to bring about sealing contact of the insulation with the perimeter of the opening.

7. In a furnace of the type having at least one carbon anode and a furnace opening, an improved cover which comprises a backing, panels disposed about the perimeter an extending transversely of the backing, flexible insulation material lining the backing and panels, and means connected to the panels and backing for adjustably moving the panels and the insulation material associated therewith in the direction of the perimeter of the furnace opening to bring about sealing contact of the insulation with the perimeter of the opening.

* * * * *

UNITED STATES PATENT AND TRADEMARK OFFICE
CERTIFICATE OF CORRECTION

PATENT NO. : 4097228
DATED : June 27, 1978
INVENTOR(S) : Denys Reginald Rosling

It is certified that error appears in the above—identified patent and that said Letters Patent are hereby corrected as shown below:

Column 4, line 31, after "LB" close parenthesis by inserting --)--;

line 38, change "1526°C" to --1526°--.

line 39, change "BUT" to --BTU--.

Column 6, line 20, delete "an" and insert --and--.

Signed and Sealed this

Twenty-eighth Day of August 1979

[SEAL]

Attest:

LUTRELLE F. PARKER

Attesting Officer

Acting Commissioner of Patents and Trademarks